United States Patent
Farrugia et al.

(10) Patent No.: US 7,936,873 B2
(45) Date of Patent: May 3, 2011

(54) SECURE DISTRIBUTION OF CONTENT USING DECRYPTION KEYS

(75) Inventors: Augustin J. Farrugia, Cupertino, CA (US); Gianpaolo Fasoli, Palo Alto, CA (US); Jean-Francois Riendeau, Campbell, CA (US); Rod Schultz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 990 days.

(21) Appl. No.: 11/800,902

(22) Filed: May 7, 2007

(65) Prior Publication Data

US 2008/0279372 A1 Nov. 13, 2008

(51) Int. Cl.
*H04L 9/16* (2006.01)

(52) U.S. Cl. .......................... 380/37; 380/44

(58) Field of Classification Search .................. 713/165, 713/171; 380/262, 259, 28, 37, 264, 268, 380/42, 43, 44, 45, 46
See application file for complete search history.

(56) References Cited

U.S. PATENT DOCUMENTS

| | | | |
|---|---|---|---|
| 6,587,563 B1 | 7/2003 | Crandall | |
| 6,898,287 B2 | 5/2005 | Crandall | |
| 6,986,043 B2 * | 1/2006 | Andrew et al. | 713/166 |
| 7,120,249 B2 * | 10/2006 | Roberts | 380/44 |
| 7,194,092 B1 | 3/2007 | England et al. | |
| 2002/0082997 A1 | 6/2002 | Kobata et al. | |
| 2003/0044017 A1 * | 3/2003 | Briscoe | 380/277 |
| 2003/0051159 A1 * | 3/2003 | McCown et al. | 713/201 |
| 2004/0006541 A1 | 1/2004 | Huddelston et al. | |
| 2004/0024688 A1 | 2/2004 | Bi et al. | |
| 2004/0268451 A1 | 12/2004 | Robbin et al. | |
| 2005/0021478 A1 | 1/2005 | Gautier et al. | |
| 2005/0050345 A1 | 3/2005 | Dowdy et al. | |
| 2005/0203959 A1 | 9/2005 | Muller et al. | |
| 2006/0021068 A1 | 1/2006 | Xu et al. | |

FOREIGN PATENT DOCUMENTS

WO  WO-2004/092956 A1  10/2004

OTHER PUBLICATIONS

Office Action mailed on Jul. 5, 2010, for European Patent Application No. 08150990.3, filed Feb. 1, 2008, 4 pages.
International Search Report mailed on Jun. 18, 2008, for PCT Application No. PCT/US08/00579, filed Jan. 16, 2008, 1 page.
Written Opinion mailed on Jun. 18, 2008, for PCT Application No. PCT/US08/00579, filed Jan. 16, 2008, 4 pages.

* cited by examiner

*Primary Examiner* — Minh Dinh
*Assistant Examiner* — Izunna Okeke
(74) *Attorney, Agent, or Firm* — Morrison & Foerster LLP

(57) ABSTRACT

For digital rights management (DRM) of e.g. digitally delivered music or video, a technique to make the decryption keys more secure. The technique fragments a message (song or video or other) into a number of portions, and uses a different decryption key for each portion. Each of the various keys is a function of the preceding key, in one version. In another version, each key is a function of a seed value and of the particular portion of the material with which the key is associated.

35 Claims, 3 Drawing Sheets

SECURE DISTRIBUTION OF CONTENT USING DECRYPTION KEYS

FIELD OF THE INVENTION

This invention relates to distribution of content using a cryptographic system, and more specifically to key management.

BACKGROUND

Protection of digital content transferred between computers over a network is important for many enterprises. Enterprises attempt to secure this protection by implementing some form of digital rights management (DRM) process. The DRM process often involves encrypting the piece of content (e.g. encrypting the binary form of the content) in order to restrict usage to those who have been granted a right to the content. Content in this situation involves alphanumeric material, audio material such as music, and video material. It also involves, of course, combinations thereof.

Cryptography is the traditional method of protecting data in transit across a computer network. In its typical application, cryptography protects communications (messages) between two mutually trusting parties from thievery or hackers by attack on the data in transit. However, for many digital file transfer applications (e.g. for the transfer of audio or video content), instead the party that receives the content (i.e., the receiving party) might try to break the DRM encryption that the party that supplied the content (i.e., the distributing party) applied to the content. Thus in this case the receiver is not a trusted party per se, but the point is to protect the distributor who owns the content from its misuse by the receiving party. In addition, with the proliferation of network penetration attacks, a third party may well obtain access to the receiving party's computer and thus to the protected content.

In many DRM systems now in use, the weakest link in security is not the encrypted data (message) but rather cryptographic key management and handling. As well known, modern cryptographic systems use keys which are strings of digital values for both encryption and decryption purposes. For instance, one of the more successful DRM systems, which distributes music online, requires that the receiving party's computer to maintain the unencrypted key for each piece of encrypted music in a "key bag" (repository) that is itself encrypted.

This approach has disadvantages. By encrypting the key bag instead of the keys contained in the key bag, this exposes the keys to a potential attack. Similarly to play a piece of content the receiving party's computer must decrypt the entire key bag, retrieve the key for a particular piece of content, and decrypt the content with the retrieved key.

This approach also disadvantageously allows different devices to use different formats for their key bags. The use of different key bag formats for different devices further exposes the keys to penetration when the content is transferred between devices.

Most current DRM systems encrypt content with a "content key" that is applied to a bulk encryption algorithm such AES, triple DES, or RC4. These are well known encryption systems. Typically these are symmetric key systems, that is the same key is used for encryption and decryption. With this method, the entire content is encrypted with a single content key. Normally of course it is relatively easy for users to share the encrypted files in an unauthorized fashion. However without the content key, such shared files are useless. In cases where the content key is discovered, for instance by hackers or other unauthorized users, the content key is often published and made available to the public. This substantially reduces security of the system and allows unauthorized downloading and successful decryption of the content without permission, which is extremely undesirable to the owner of the content. Usually the attackers or hackers share the discovering process, in addition to the keys themselves, and as a result even more keys are discovered and published in a public database. The less experienced users who may not be able to use the discovery process can then access the database, which is often provided in a website, to see if the content key for their particular piece of content, for instance a particular piece of music or video, is published and in turn break the copy protection on material that they have obtained without paying for. This type of attack, also known as a dictionary attack, has been found to be successful.

It is well known that an attack can discover the content key associated with each piece of content. Specifically, the content key typically remains available during play in the memory of the playback device (which is a computer or for instance digital music or video player), or even longer when the end user pauses during play. Specific DRM implementations protect against this "pause attack" already have been implemented.

This dictionary attack problem is becoming more harmful to owners of the distributed digital content, especially since there are only a few currently available commercially successful systems for distribution of videos and audio. Since there are only a few such systems, hackers, by focusing on the content available via those systems and publishing the content keys, have made unauthorized use of the content even easier.

In a typical DRM system, the pieces of encrypted digital content are maintained on a central server by the content owner or operator of the service. Users then download to their computer via the Internet particular pieces of content such as a song or a video program. The downloaded material is typically downloaded in encrypted form and the content key is transmitted also, often in a separate transmission. This is done for some form of payment. The user can then play the content by decrypting it on his computer or player. This process is transparent to the user if he has purchased an unauthorized piece of digital content since the key accompanies the downloaded file and software installed on the user's computer decrypts the file. It is also possible for the user to download the digital file to a media player. Typically this second download is also performed in the encrypted state and then the decryption occurs upon playback in the player. Again this is transparent for properly purchased content. It is generally been found best if the decryption only occurs upon playback, for security reasons. Of course if the content key has been compromised as described above, that is published, anyone can access the song and transfers of the encrypted files to unauthorized users is easily accomplished and they can then apply the decryption key even though not authorized to do so.

Therefore, the present inventors have determined that this type of so-called dictionary attack whereby keys are listed and publicly distributed to unauthorized users is a significant problem.

SUMMARY

In accordance with this disclosure, an improved key management system is disclosed. Instead of encrypting an entire piece of content such as a song or musical selection or video program with a single content key, a number of keys are associated with each piece of content whereby each of the keys is valid for only a portion of the content. This has some similarities to the well known block cipher technique whereby a particular message, rather than being enciphered or encrypted using a single key, instead is fragmented into a number of portions and each portion is individually encrypted. However, in typical prior block ciphers the same key is used for each block of the message. While this is satisfactory for traditional encryption approaches where typically each message is only sent once, it is not suitable for the present situation where a particular piece of content may be distributed to tens or hundreds of thousands of users with the same key. The present system is intended for use with symmetric ciphers.

Therefore in accordance with this disclosure each piece of encrypted content when distributed is accompanied by an initial key value, which is itself not necessarily a decryption key. For purposes of decrypting the content, a first key is generated from the initial key value using a known (predetermined) function. The content for purposes of encryption (and later decryption) is fragmented into a plurality of portions or blocks. These need not be of equal length. The first key generated from the initial key value is used to decrypt the first portion or block of the message. However that key is not useful for the remaining blocks. Instead an additional key is derived (again typically by some predetermined mathematical function or other type of algorithm) for each successive key, each key being associated with one block. Thereby instead of only one key being used for decrypting the entire piece of content (message), a typical piece of content (song or video, for instance) has multiple keys.

This makes the above-described dictionary attack very unsatisfactory since the hackers, rather than only publishing a single key or key value for each piece of content, must publish a large number of them and moreover since the length of the blocks may vary from song to song or even within one song (piece of content) even availability of the entire list of keys does not provide proper decryption, since one must also for decryption purposes know the length of each block. In one embodiment, the initial key value is used to calculate the first key and then the first key is used to generate the second key using a predetermined function and the third key is generated using the second key and the predetermined function, etc. This is useful when the content is intended to be decrypted block by block in order. Thus each key is a function of the preceding key.

In another embodiment, the user may need random access to various portions or blocks of the piece of content and does not want to decrypt them in order. In that case, the above method is too slow since all keys must be derived in sequence. In the alternative, the initial key value is used together with a portion of the encrypted content or some other changing parameter to obtain the value of each content key associated with each block or portion. In other words, the initial key is a master key and the content information provides the derivation parameter so that each key value is a function of the initial key value and some seed value (the initial key value) derived from the particular content of each block.

As pointed out above, the lengths of the blocks or portions of each piece of content (message) need not be uniform message-to-message or even within one message (piece of content). Instead, a particular fragmentation algorithm can be used so that the block lengths differ, further making unauthorized decryption difficult. Of course, there must be a way of communicating the method and associated parameters by which the message is fragmented into blocks to the user so that his playback device can decrypt same. In one embodiment this is accomplished by adding information to the video block related to the decryption process.

In accordance with this disclosure contemplated is the method of decrypting the content as described above, and also the complementary method of encrypting same. Contemplated also is a method of transmitting the encrypted content and receiving the encrypted content and decrypting it. Also contemplated is a computer product, including a storage media storing computer code for carrying out the method of encrypting and separately a computer product for carrying out the method of decrypting. Also contemplated is an apparatus for decrypting previously encrypted content, including a properly programmed player or computer. Also contemplated is an apparatus for encrypting the content which typically would reside in a central server, the apparatus including the server, and including the software for carrying out the encryption.

DETAILED DESCRIPTION

Figure 1:
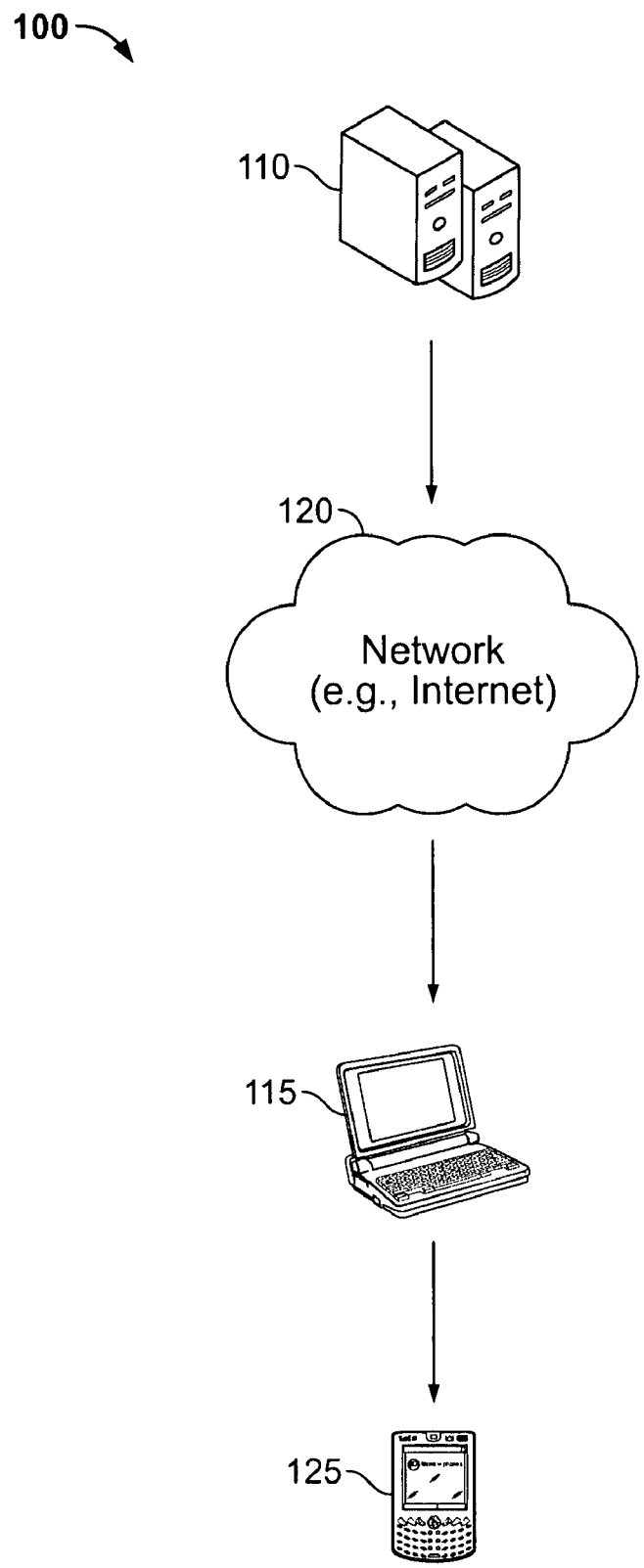
FIG. 1 shows a content distribution system in which the present method and apparatus would operate.

FIG. 1 illustrates a content distribution 100 which is the conventional environment in which the method and apparatus in accordance with this invention would typically be employed. This is a well known system as described above, for instance for distribution of music, videos, etc. of which several types are now commercially available. This content distribution system distributes content in a manner that protects the digital rights, that is ensures legal use of the content. The content distribution system 100 includes a DRM server (or set of servers) 110 and a content-receiving user device 115. Device 115 is typically a computer or equivalent. While only one user device 115 as shown in FIG. 1, the content distribution system 100 can serve many such devices in typical commercial embodiments. While FIG. 1 illustrates a user device 115 as a portable computer, it could for instance be a desktop computer, personal digital assistant (PDA), cell phone, an audio player, a video player or any other user device capable of receiving content online. The user device 115 connects to the DRM server set 110 through a computer network 120, such as a local area network, a wide area network or a network of networks such as the Internet.

Through the network connection, the user device 115 communicates with the set of DRM servers 110 to purchase, license, update or otherwise obtain content. While in some embodiments the DRM server set 110 sells or licenses content to user devices, in other embodiments this is not the case and the DRM server set 110 may simply enforce distribution of content to authorized user devices without financial exchange being involved.

In some embodiments, the DRM server set 110 includes a content caching server that provides encrypted content to a user device 115 through the network 120 after another server in the DRM server set 110 determines that the user device 115 can obtain the content, for instance it has been paid for. In certain embodiments, system 100 may include multiple caching servers to cache content at various locations on the network, to improve speed and efficiency of downloading across the network.

In some embodiments, the downloaded content is copied from the user device 115 into one or more other user devices. For instance, FIG. 1 illustrates the other user device 125 as a portable media player. Device 125 can be any device capable of utilizing the downloaded content. It may be a music player, video player, game console, camera, etc. The portable media player is typically connected to the user device 115 via a conventional local data connection, such as a universal serial bus (USB), IEEE 1394, infra-red, wireless connection or any other type of known connection. In most situations the computer device 115 can itself play the content, or it can be used as an intermediary to download to player 125. Use of the intermediary device 115 is typically because most players 125 currently do not have the requisite user interface or Internet connectability for downloading content. However it is contemplated in the future they will and in that case the intermediary computer 115 may be dispensed with and such products have even been announced. Thus the decryption and playback of the content may take place either at the computer device 115 or the user device 125.

It is recognized that the present process does not conform to the usual standards for secure encryption. This is because once the algorithm or process for calculating the keys from the initial key value are known, it is relatively easy to do so by a hacker. However as noted above, the present encryption is not for the standard type of secure encryption, for instance for financial transactions, but instead is meant to be used in the context of mass distribution of music and audio files. These are typically distributed at very low cost such as $1.00-$5.00 each, and high levels of encryption are not necessarily desirable because they may slow down distribution and decryption, that is access to the content. Instead the goal here is to defeat the above-described dictionary attack which allows sophisticated hackers to pass on their knowledge to the less sophisticated person. The present inventors have determined that is accomplished in accordance with this disclosure by the use of a proliferation of keys for each piece of content (message) even though as pointed out above a sophisticated hacker may be able to derive the keys one from another. In one embodiment, the encryption used is symmetric (such as AES, triple DES, or RC4), where the same keys are used for encryption and decryption.

The present process and apparatus and associated methods provide a solution to the dictionary attack, whereby the content is no longer encrypted with a single content key, and instead a plurality of keys are derived during the decryption process, each being valid for a portion of the content. This starts with an initial content key value. Subsequent content keys denoted $CK_n$ are derived using a predetermined algorithm during the playback process in accordance with the section of the content to be decrypted.

In the present process, the content key is no longer static. Instead it is created during the decryption process based on the initial content key value and a portion of the content to be decrypted. The initial content key value can also be regarded as a seed value. The initial state of the process uses the initial content key value $CK_0$. This is, in one embodiment, the content key already used in certain DRM systems (such as FairPlay from Apple, Inc.) and extracted from the private (secure) part of the FairPlay SInf. An SInf is a data structure in FairPlay that contains the key needed to decrypt a piece of content. The SInf is itself encrypted. The DRM system sets the initial state with the initial content key value and it decrypts the content part related to the initial content key value. During the decryption of the content, the DRM then derives a subsequent content key $CK_i$ from $CK_0$, with $CK_1=f(CK_0)$ where "f" is a predetermined function. Hereinafter, the initial content key value is referred to as $CK_0$. The DRM logic then discards the $CK_0$ value which is replaced by $CK_1$ for the next decryption process for the subsequent portion of the content. Thus each portion of the content may be viewed as a "block" having for instance a fixed length, but this is not necessarily the case. The DRM iterates through the key derivations with $CK_n=f(CK_{n-1})$ for each block n. The DRM uses a newly derived key $CK_n$ and discards $CK_{n-1}$ for decrypting each block.

This process segments use of the content key and reduces the period of time during which any particular content key $CK_n$ is exposed to an attack. Thus attacks by hackers are made more difficult because the hackers need to determine the complete sequence of key values $CK_n$ or the derivation function and the initial key $CK_0$.

The above key derivation process is less useful where the decryption needs random access to the content. In other words, rather then being decrypted block by block in sequence, only one block at a random location in the content may need decryption. Hence in an alternative embodiment for the random access situation, the initial content key $CK_0$ is a seed used in conjunction with a portion of the encrypted content to obtain the value for $CK_i$. In other words, the initial content key is a master key or seed value and the content information is a derivation parameter such that $CK_i=g(CK_0, SeedInfo_p)$ where g is a predetermined function. This approach provides a process that allows random access to the content with decryption in random fashion without dependency on previous decryption of the earlier portions of the content. In the case of content such as music videos, electronic books, this random access is important since the end user can thereby play back, fast forward, rewind, skip or select randomly any part of the content as is typically done.

Figure 2:
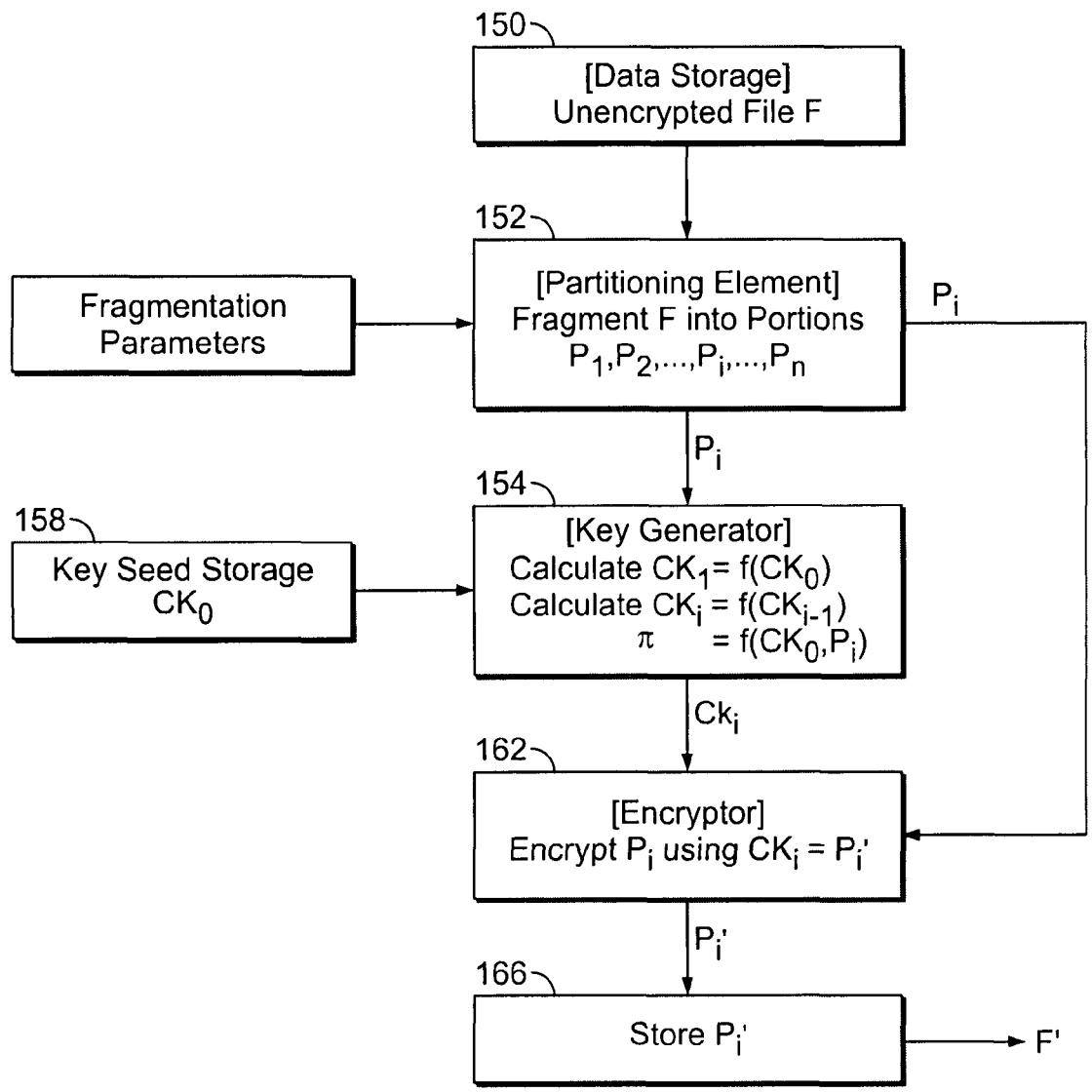
FIG. 2 shows a method and associated apparatus in accordance with this invention for encrypting.

FIG. 2 shows a method and the associated apparatus in accordance with this disclosure for encryption. This is typically carried out in the context of a computer or computing device which is properly programmed and associated with servers 110. Coding the appropriate program would be routine in light of this disclosure. The actual encryption algorithm is typically conventional, such as one of the above described symmetric encryption techniques, but not so limited. Coding the appropriate computer programs for the encryption function, the key management, the decryption function and associated key management are routine in light of this disclosure and the well known aspects of DRM systems.

In FIG. 2 there is a data storage element 150, typically a computer memory, which holds the unencrypted file F, which typically is a piece of music or a video file in standard digital form. This file is then passed to partitioning element 152 which fragments file F into portions $P_1$, $P_2$, etc. The fragmentation is performed by the fragmentation function described below, which can take one of many forms. This is typically under the control of particular fragmentation parameters as described below. The purpose of this fragmentation is to arrive at portions or blocks which are of unequal length. In addition to varying the fragmentation parameters, the actual fragmentation function may vary. In either case, both the fragmentation parameters and the function must be conveyed along with the encrypted file. The output of the partitioning element is a portion designated $P_i$, which is communicated to the key generator 154, which calculates the keys as shown. Typically the first key is a function of the seed (initial content key) value $CK_0$, which is stored in a storage 158. This seed value is typically supplied as, for instance, a random number. The output of the key generator is a content key $CK_i$, which is supplied to the encryptor 162, which then encrypts portion $P_i$ using $CK_i$, to result in the encrypted portion or block $P_i'$. $P_i'$ is then supplied to a storage 166 which accumulates the various $P_i$'s resulting in the encrypted file F. This file F is typically then transmitted to the user computer 115 via network 120. The associated seed value is also transmitted along with the needed fragmentation parameters, using conventional DRM techniques. In one embodiment, the seed value is sent encrypted in a separate file from the content.

Figure 3:
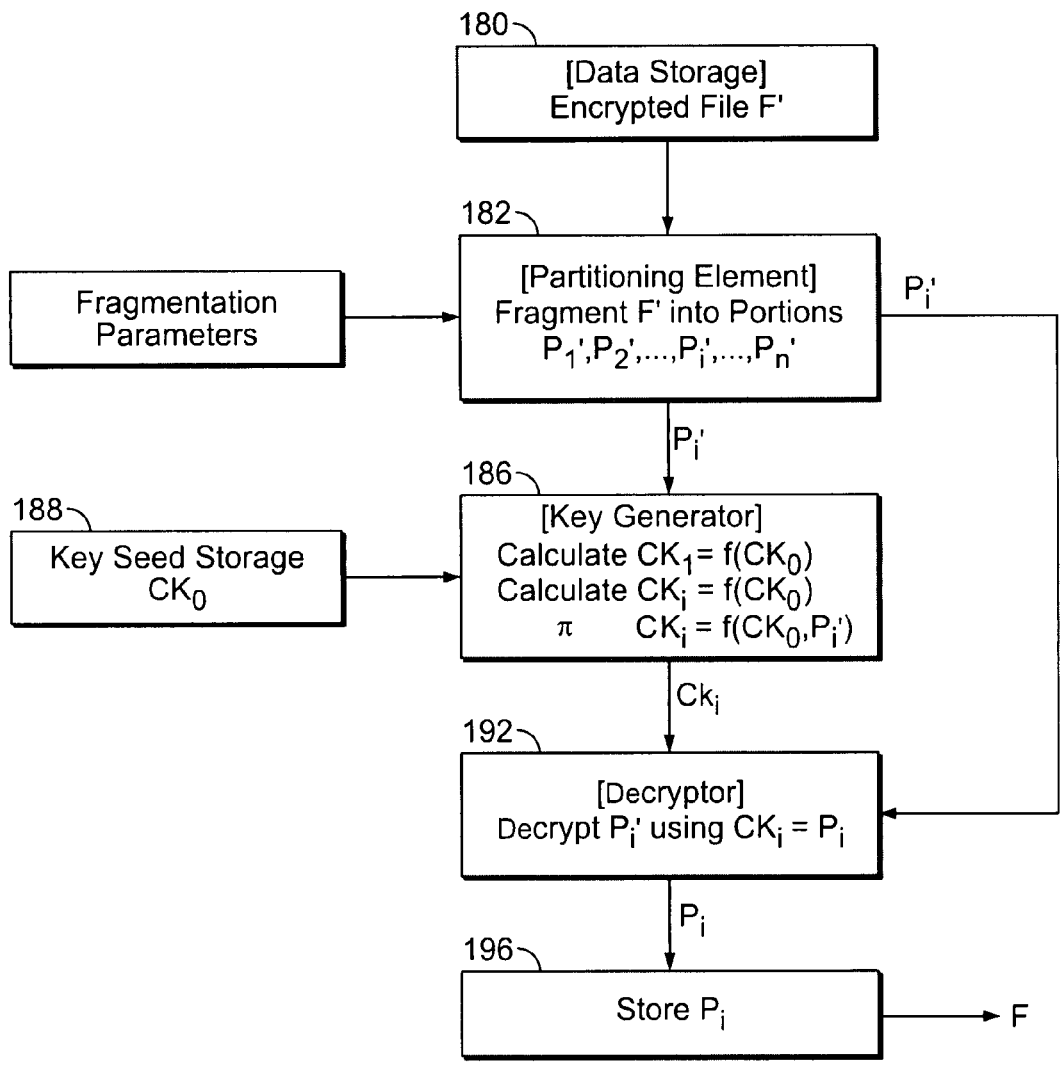
FIG. 3 shows a method and associated apparatus in accordance with this invention for decrypting.

The associated decryption technique and apparatus, which are complementary to that of FIG. 2, are shown in FIG. 3. While the activity of FIG. 2 typically takes place at the head end or server 110 shown in FIG. 1, the activity of FIG. 3 takes place in computer 115 and/or player 125. However in other respects, it is essentially complementary. As shown, data storage 180 is typically memory in the computer 115 or in the player 125, which stores the encrypted file F' received over network 120 from the servers 110 shown in FIG. 1. The next element shown in FIG. 3 is the partitioning element 182 which is similar to the partitioning element 152 of FIG. 2. However this partitioning element 182 operates on the encrypted file F' fragmenting it into portions $P_i'$ etc. according to the fragmentation parameters which are provided in the block content, to enable decrypting of that block. (These are the same fragmentation parameters in terms of actual values shown in FIG. 2.) These are conveyed in a secure fashion. The partitioning element 182 then supplies its various encrypted portions or blocks $P_i$ first to the key generator 186 which calculates the keys as shown using the seed value $CK_0$ stored in the storage 188 associated with the computer 115 or player 125. This is the same seed value as used in FIG. 2, for any particular file. Again, this must be conveyed in some secure fashion, along with the encrypted file F'. The resulting keys $CK_i$ are then provided to the decryptor 192 which here is symmetric to encryptor 162 in FIG. 2 in one embodiment. Also supplied to the decryptor 192 is the encrypted portion $P_i'$ which is then decrypted using the key seed $CK_i$, to result in the decrypted portion $P_i$. This decrypted form of block $P_i$ is then supplied to a storage 196 which stores each $P_i$ as it is processed, resulting in the decrypted file F, which is suitable for play on the computer 115 or player 125 or other operations thereon.

Note that the blocks or portions of the content to be decrypted need not be of standard or fixed length in accordance with this disclosure. Fixed length blocks are well known in encryption. In accordance with this disclosure, the length of the blocks may differ as determined by a fragmentation or partitioning algorithm or process so that the blocks vary in length. This makes it even harder for a hacker to penetrate the system. Further, the fragmentation algorithm may change between various pieces of content so that different pieces of content are fragmented in different ways. An example of a fragmentation function is a key derivation process, e.g. the derived key=AES (master key, block information). Thus the content is partitioned into frames. Each frame has control information that is not encrypted. The data is encrypted or decrypted according to the control information, for instance the fragment number. Note that the length of each fragment or portion would not be apparent from the encrypted form of the content, thereby making breaking this protection system even harder.

This disclosure is illustrative but not limiting; further embodiments will be apparent to one skilled in the art in light of this description and are intended to fall within the scope of the appended claims.

What is claimed as new and desired to be protected by Letters Patent of the United States is:

1. A method of decrypting encrypted content, comprising the acts of: providing the encrypted content; providing an initial key value; partitioning the encrypted content into a plurality of portions; generating a first key using the initial key value; decrypting a first of the portions using the first key; generating a second key using the initial key value, the second key differing from the first, wherein the second key is generated by applying a predetermined function to the initial key value and a seed value, the seed value being derived from the content of a second of the portions; and decrypting the second of the portions, which does not immediately follow the first of the portions, using the second key.

2. The method of claim 1, further comprising the act of receiving the encrypted content and the initial key value at a playback device.

3. The method of claim 1, wherein the act of generating the first key comprises applying a predetermined function to the initial key value.

4. The method of claim 1, wherein in the partitioning, the plurality of portions differ in length as determined by a fragmentation algorithm and wherein the fragmentation algorithm varies between pieces of content so that different pieces of content are fragmented in different ways.

5. The method of claim 1, wherein the content includes audio information.

6. The method of claim 1, wherein the content includes video information.

7. The method of claim 2, wherein the encrypted content and initial key value are received in separate messages.

8. The method of claim 2, wherein the act of receiving comprises:
receiving the encrypted content and initial key value at a computer device;
storing the encrypted content and initial key value in the computer device; and
transmitting the stored encrypted content and initial key value to the playback device.

9. The method of claim 1, wherein the decrypting includes applying a decryption function symmetric to a function used to encrypt the encrypted content.

10. The method of claim 5, wherein the content is music or a video.

11. The method of claim 1, wherein providing the initial key value comprises:
receiving the initial key value from a source distinct from a source of the encrypted content.

12. The method of claim 4, wherein the act of partitioning comprises:
applying a partitioning function to a first piece of content that differs from a partitioning function applied to a second piece of content.

13. The method of claim 1, wherein the initial key value is provided in encrypted form; and further comprising the act of decrypting the encrypted initial key value.

14. A computer readable memory storing computer code carrying out the method of claim 1.

15. A decrypted file generated by the method of claim 1.

16. The method of claim 1, further comprising the act of playing the decrypted content.

17. A method of providing encrypted content, comprising the acts of: providing the content; providing an initial key value; partitioning the content into a plurality of portions, including at least a first and a second portion; generating a first key from the initial key value; encrypting the first of the portions using the first key; generating a second key from the initial key value, the second key differing from the first key, wherein the second key is generated by applying a predetermined function to the initial key value and a seed value, the seed value being derived from the content of the second of the portions; and encrypting the second of the portions, which does not immediately follow the first of the portions, using the second key.

18. The method of claim 17, further comprising the act of transmitting the encrypted content and the initial key value to a playback device.

19. The method of claim 17, wherein the act of generating the first key comprises applying a predetermined function to the initial key value.

20. The method of claim 17, wherein in the partitioning, the plurality of portions differ in length as determined by a fragmentation algorithm and wherein the fragmentation algorithm varies between pieces of content so that different pieces of content are fragmented in different ways.

21. The method of claim 17, wherein the content includes audio information.

22. The method of claim 17, wherein the content includes video information.

23. The method of claim 18, wherein the encrypted content and initial key value are transmitted in separate messages.

24. The method of claim 18, wherein the act of transmitting comprises:
   transmitting the encrypted content and initial key value to a computer device;
   storing the encrypted content and initial key value in the computer device; and
   transmitting the stored encrypted content and initial key value to the playback device.

25. The method of claim 17, wherein the encrypting includes applying an encryption function symmetric to a function used to decrypt the encrypted content.

26. The method of claim 21, wherein the content is music or a video.

27. The method of claim 17, wherein providing the initial key value comprises:
   receiving the initial key value from a source distinct from a source of the encrypted content.

28. The method of claim 20, wherein the act of partitioning comprises:
   applying a partitioning function to a first piece of content that differs from a partitioning function applied to a second piece of content.

29. The method of claim 17, wherein the initial key value is provided in unencrypted form; and further comprising the act of encrypting the initial key value.

30. A computer readable memory storing computer code carrying out the method of claim 17.

31. An encrypted file generated by the method of claim 17.

32. Apparatus for decrypting previously encrypted content, the apparatus comprising: a data storage which stores the encrypted content; a key seed storage which stores a key seed value; a partitioning element coupled to the data storage and which partitions the encrypted content into a plurality of portions including at least a first and a second portion; a key generator coupled to the key seed storage and which generates an initial key from the key seed value and a first key from the initial key value and generates a second key, the second key differing from the first, wherein the second key is generated by applying a predetermined function to the initial key value and a seed value, the seed value being derived from the content of the second of the portions; and a decryptor coupled to the key generator and the partitioning element, and which decrypts the first of the portions using the first key and the second of the portions, which does not immediately follow the first of the portions, using the second key.

33. Apparatus for encrypting content, the apparatus comprising: a data storage which stores the content; a key seed storage which stores a key seed value; a partitioning element coupled to the data storage and which partitions the content into a plurality of portions including at least a first and a second portion; a key generator coupled to the key seed storage and which generates an initial key from the key seed value and a first key from the initial key value, and generates a second key; the first key differing from the second key, wherein the second key is generated by applying a predetermined function to the initial key value and a seed value, the seed value being derived from the content of the second of the portions; and an encryptor coupled to the key generator and the partitioning element, and which encrypts the first of the portions using the first key and the second of the portions, which does not immediately follow the first of the portions, using the second key.

34. The apparatus of claim 32, wherein the partitioning element uses a fragmentation algorithm that varies between pieces of content.

35. The apparatus of claim 34, wherein the partitioning element uses a fragmentation algorithm that varies between pieces of content.

* * * * *